W. A. HINDS.
EXPANDER FOR TIRE VULCANIZERS.
APPLICATION FILED AUG. 16, 1911.
1,068,654.
Patented July 29, 1913.
2 SHEETS—SHEET 2.
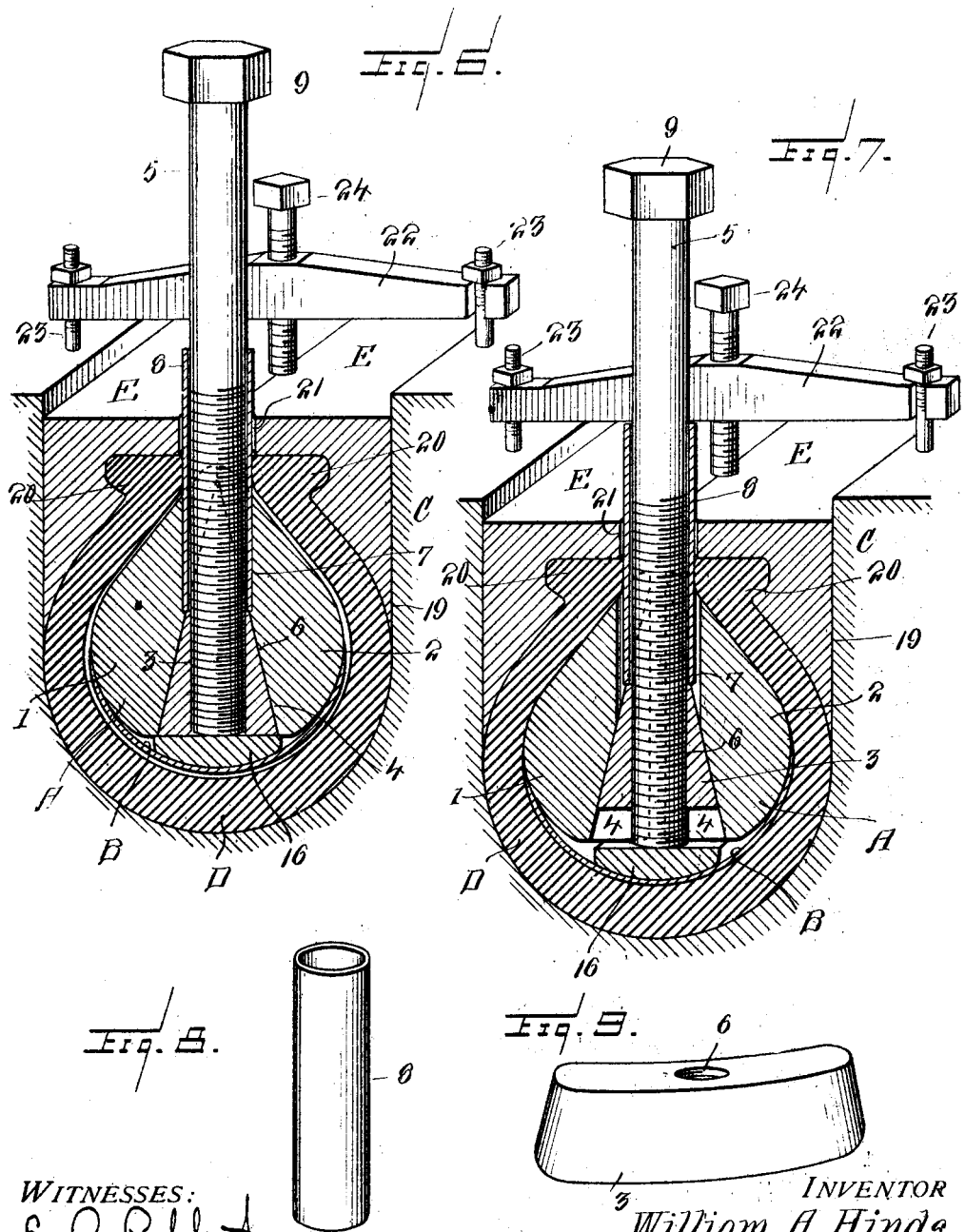
WITNESSES:
E. Q. Ruppert
A. C. Ege
INVENTOR
William A. Hinds
BY
Chattin Bradway
Attorney

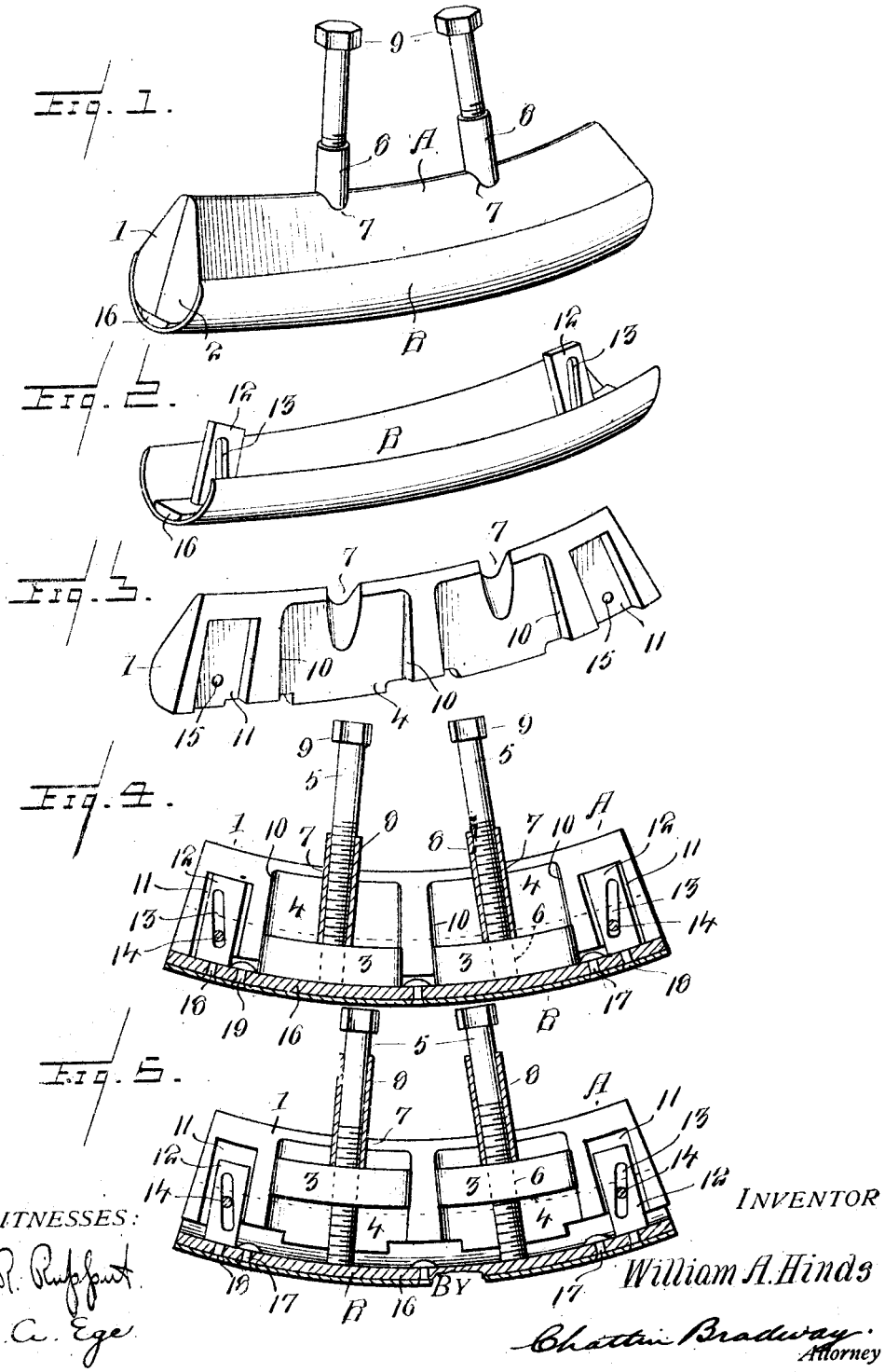

UNITED STATES PATENT OFFICE.

WILLIAM A. HINDS, OF READING, PENNSYLVANIA, ASSIGNOR OF ONE-HALF TO SHERMAN H. HOVERTER AND ONE-HALF TO HARVEY E. EBERLY, BOTH OF READING, PENNSYLVANIA.

EXPANDER FOR TIRE-VULCANIZERS.

1,068,654.  Specification of Letters Patent.  Patented July 29, 1913.

Application filed August 16, 1911. Serial No. 644,439.

*To all whom it may concern:*

Be it known that I, WILLIAM A. HINDS, a citizen of the United States, residing at Reading, in the county of Berks and State of Pennsylvania, have invented certain new and useful Improvements in Expanders for Tire-Vulcanizers, of which the following is a specification.

This invention relates to vulcanizing apparatus for tires and has to do more particularly with an expanding device which is placed inside the shoe, sheath or case of a pneumatic tire for applying an internal pressure when the shoe, sheath or case is being repaired by the vulcanization process, the expander being of the mechanical type as contradistinguished from the pneumatic or air bag expander which is objectionable for various reasons. For instance, the air bag expander is incapable of exerting as great a pressure on the tire case as a mechanical expander, is subject to blow-outs during the critical time of vulcanizing when the pressure should be retained, is of comparatively short life and expensive, and on the whole does less satisfactory work than the type of expander herein disclosed.

The invention has for one of its objects to improve and simplify the construction and operation of tire expanders for vulcanizers so as to be comparatively simple and inexpensive to manufacture, reliable and efficient in use, and so designed that tires can be quickly and satisfactorily repaired in such a manner that the repaired portion is practically as good as the original structure, as the pressure exerted by the expander, in combination with the heat, causes canvas and rubber patching pieces to be thoroughly consolidated in the tire without the liability of pockets of gas or air occurring which will render the repair of very short life.

Another object of the invention is the provision of an expander consisting of a sectional core and a shoe partially embracing the core to bridge the gap when the sections are expanded, in combination with a novel means for movably and detachably connecting the parts together so as to constitute a unitary structure capable of being conveniently placed in or removed from a tire shoe without the parts being liable to separate.

Another object is the employment of improved means for expanding the core and an improved construction for the core sections and the core shoe.

With these and other objects in view, as will appear as the description proceeds, the invention comprises the various novel features of construction and arrangement of parts which will be more fully described hereinafter, and set forth with particularity in the claims appended hereto.

In the accompanying drawings, which illustrate one embodiment of the invention, Figure 1 is a perspective view of the expander with its parts assembled and in contracted position, preparatory to assemblage in a pneumatic tire shoe or case. Fig. 2 is a perspective view of the shoe applied to the core of the expander. Fig. 3 is a perspective view of one of the core sections. Figs. 4 and 5 are central longitudinal views of the expander respectively showing the parts in normal and expanded positions. Fig. 6 is a sectional perspective view showing a tire case clamped in a vulcanizer and containing the expander, the parts of which are in normal or contracted position. Fig. 7 is a similar view showing the expander expanded. Fig. 8 is a perspective view of one of the tire protecting sleeves applied to the expanding-wedge operating screws. Fig. 9 is a perspective view of one of the expanding wedges.

Similar reference characters are employed to designate corresponding parts throughout the views.

Referring to the drawings, A designates the core of the expander, and B the shoe thereof. The core A is an arcuate body having a radius depending upon the diameter of the tire case from which the expander is to be used, and this body is of such cross-sectional dimensions as to conform generally to the internal surface of the tire case. The core is divided longitudinally into two sections 1 and 2 which are symmetrical and are adapted to expand laterally by suitable expanding means located between the sections. In the present instance, the expanding means comprises a plurality of wedges 3 which are disposed in wedge recesses 4 formed in the meeting faces of the core sections 1 and 2, the recesses of one section being registered with those of the opposite section, so that a tapering chamber will be formed for each wedge. The wedges are respectively operated by screws 5 which are threaded in tapped openings 6 of the wedges. The screws are disposed radially and pass out of the core through openings 7, the said openings being large enough to accommodate sleeves 8 that surround the threaded portions of the screws and protect the edges of the tire case against the chafing or cutting action of the screw threads during the turning of the latter. The outer ends of the screws are formed with heads 9 for application of an operating wrench, and these heads serve to retain the sleeves 8 on the screws. The end walls 10 of the wedge recesses or chambers 4 coöperate with the openings 7 to maintain the wedges and operating screws in proper relative position. The meeting faces of the sections 1 and 2 are also provided with registering recesses or chambers 11 for receiving retaining lugs 12 on the shoe B, as clearly shown in Figs. 4 and 5, the said lugs having slots 13 parallel with the central transverse radial plane of the expander, and through these slots pass removable holding devices 14 in the form of pins that pass through openings 15 in the core sections. These pins extend transversely to the core sections and are so located that the shoe B covers the ends of the openings 15 at all times throughout the normal operation of the expander so that the pins 14 cannot work out. Thus, by means of the lugs 12 and pins 14, the core and shoe of the expander are permanently connected together and are at the same time capable of relative movement.

As clearly shown in Fig. 2, the shoe B consists of an arcuate trough-like structure which is approximately semi-circular in cross-section and so proportioned as to snugly embrace the wider portion of the core. The shoe is stiffened by a reinforcing bar 16 that is disposed within and extends longitudinally thereof, it being fastened to the shoe by rivets 17, as shown in Figs. 4 and 5, and the lugs 12 have rivet shanks 18 which pass through the reinforce 16 and shoe and are upset so that the lugs will be fixed parts of the shoe. This reinforce 16 forms bearings for the inner ends of the operating screws 5 which are made as hard as possible, and without the reinforce the screws might eventually cut through the shoe.

When the parts of the expander are in normal position, as shown in Figs. 1 and 4, the wedges 3 are at the bottom of the recesses 4, so that the core sections will fit together. In order to expand the parts, the screws 4 are turned so as to draw the wedges 3 upwardly between the core sections, the inclined walls of the recesses 4 being engaged by the wedges which spread the core sections laterally. It will be observed that the screws impinge on the shoe B, and as the result the shoe will be moved outwardly in a more or less radial direction at the time the wedges 3 are being raised, as indicated in Fig. 5.

In Figs. 6 and 7, the use of the expander is illustrated. C designates a fragment of a vulcanizer which has a tire-receiving chamber 19 for receiving the tire D, and the usual bead molds or cleats E which engage the bead portions 20 of the tire. The vulcanizer shown is one now commonly used, and in order to adapt my expander thereto, it is merely necessary to provide openings, as at 21, in the bead molds E so as to accommodate the operating screws 5 to the sleeves 8 which pass into the vulcanizer between the bead molds. Extending across the chamber 19 of the vulcanizer are the usual clamp bars 22 engaged with screw studs 23 and carrying tightening bolts 24 that engage both bead molds at their line of division so that the said molds can be clamped firmly in place about the base portion of the tire. Only one clamp bar is shown, but in practice two or more are employed. Before assembling the tire in the vulcanizer, the expander is placed in the tire and the molds E applied to the bead portion of the same. The tire expander and molds are now placed as a unit into the vulcanizing chamber 19 and the parts locked together by the clamping bar 22 and tightening bolts 24. In some operations, it is desirable to heat the expander before it is placed in the tire, as the expander constitutes a considerable mass of metal which, by retaining heat, will greatly facilitate the repair of the tire. After the parts are assembled, as shown in Fig. 6, the screws 5 are turned so as to force upwardly the wedges 3 between the core sections 1 and 2, from the position shown in Fig. 6 to that shown in Fig. 7, the lateral and web portions of the tire being thus placed under compression. At the same time the shoe B is forced outwardly by the screw so that the tread portion of the tire will be placed under compression. Thus pressure can be applied to all points of the tire in a uniform and forcible manner, and while the patching material is thus held under compression and subjected to the vulcanizing action, a repair will result which is practically incapable of detection, as compared with the remainder of the tire. The tire immediately around the operating screws and sleeves will become distorted because of the interposition of these parts, but the fabric can be restored to its original condition by working it between the fingers while the fabric is still soft from the vulcanizing heat. It will be observed that an expander of this type is well adapted for repairing torn beads, as great pressure can be applied to the bead portion of the tire as well as to the tread or any other portion.

Should it be desired to take the expander apart, it is merely necessary to expand one end of the expander abnormally by tightening the operating screw 5 at such end and by so doing the shoe B will be forced outwardly to such an extent that the openings 15 will be uncovered, with the result that the pin 14 can be driven out. The other operating screw is then manipulated in the same manner to cause the expander to open to such an extent as to permit access to the other pin 14, which, upon being driven out, allows the shoe B to be detached from the sections 1 and 2 of the core A, which sections, being wholly detached from each other, will separate. Obviously, the parts are assembled and connected together in just the opposite manner from which they are disassembled.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. An expander comprising a core body divided from end to end into members adapted to spread apart, a shoe bridging the space between the members, and means within the core body for movably connecting the members and shoe together.

2. An expander comprising a core body divided longitudinally into members adapted to spread apart, a shoe bridging the space between the members, and means within the core body for movably connecting the members and shoe together, said means consisting of retaining lugs on the shoe extending between and connected with the members.

3. An expander comprising core members adapted to spread apart, a shoe bridging the space between the members, means for movably connecting the members and shoe together, said means consisting of retaining lugs on the shoe extending between the members, and removable elements in the members engaged with the lugs.

4. An expander comprising core sections, a shoe, slotted members on the shoe slidably extending between the core sections, pins extending transversely through the core sections and through the slots of the said members, and expanding means acting on the core sections and shoe.

5. An expander comprising core sections, a shoe, slotted members on the shoe slidably extending between the core sections, pins extending transversely through the core sections and through the slots of the said members, and means located between the core sections for moving the same outwardly and for moving the shoe outwardly, said pins being so located as to be retained in place by the shoe throughout the operative range of movement of the sections and shoe.

6. An expander comprising a core adapted to gap open throughout its length in expanding, a shoe substantially as long as the core for covering the gap, means for movably retaining the shoe on the core, and means for expanding the core.

7. An expander comprising a core adapted to gap open throughout its length in expanding, a shoe substantially as long as the core for covering the gap, means between the ends of the core and shoe for movably and removably connecting them together, and a device for expanding the core outwardly and moving the shoe simultaneously.

8. An expander comprising a core expandible laterally, a member substantially as long as and partially embracing the core and movable outwardly transversely to the direction in which the core expands, and means for connecting the core and member together.

9. An expander comprising a core expandible laterally, a member partially embracing the core and movable outwardly transversely to the direction in which the core expands, means for connecting the core and member together, said means comprising a slotted lug extending into the core and fastened to the member, and a retainer or the core extending through the slot of the lug.

10. An expander comprising an expandible core having a transverse passage, a shoe on the core, a member on the shoe and extending into the passage, means extending across the passage and detachably engaging the member to retain the shoe and core together, a wedge for expanding the core, and a device for operating the wedge and acting on the shoe for enlarging the expander.

11. The combination of a core divided longitudinally into two sections, said sections having lug and wedge recesses in their meeting faces, a shoe partially embracing the sections, lugs on the shoe extending into the lug recesses, means on the core sections engaging the lugs to retain the shoe and core together, wedges in the wedge recesses, and operating screws passing between the core sections and through the wedges with their inner ends bearing on the shoe to move the latter outwardly while the wedges move the core sections apart.

12. The combination of a pair of core setions having transverse openings, pins in the openings for holding the sections together, a shoe partially embracing the sections and covering the openings to retain the pins, expanding means operating on the core sections and shoe, and means on the shoe engaging the pins to hold the core sections and shoe together as a unitary article.

13. The combination of a core, an expanding means therefor including a screw, a shoe on the exterior of the core and movable outwardly by the screw during the expansion of the core, and a reinforce on the shoe forming a bearing for the screw.

14. The combination of an expandible core, means for expanding the core including a screw extending into the latter, and a tire protector separate from the expanding means and surrounding the portion of the screw outside the core.

15. The combination of a core divided longitudinally into two sections, an operating screw extending between the sections, a head on the outer end of the screw, a sleeve on the portion of the screw between the core and head, and means operated by the screw to expand the core.

16. In an expander of the class described, a shoe having a longitudinal reinforce.

17. In an expander of the class described, an arcuate shoe of hollow approximately semi-circular cross-section, and a reinforcing strip extending longitudinally within the same.

18. In an expander of the class described, the combination of a core body and an arcuate shoe of hollow approximately semi-circular cross-section, a reinforcing strip extending longitudinally within the same, and members rising from the strip and connected with the core body.

19. In an expander of the class described, an arcuate shoe of hollow approximately semi-circular cross-section, a reinforcing strip extending longitudinally within the same, and radial members within the shoe and fastened to the strip.

In testimony whereof I affix my signature in presence of two witnesses.

WILLIAM A. HINDS.

Witnesses:
  SHERMAN H. HOVERTER,
  MARTHA S. HOVERTER.